United States Patent [19]

Martin et al.

[11] Patent Number: 4,610,305
[45] Date of Patent: Sep. 9, 1986

[54] OILFIELD FLOODING POLYMER

[75] Inventors: Fred D. Martin; Melvin J. Hatch; Joel S. Shepitka, all of Socorro, N. Mex.; Lorraine G. Donaruma, Syosset, N.Y.

[73] Assignee: The New Mexico Institute of Mining and Technology, Socorro, N. Mex.

[21] Appl. No.: 652,375

[22] Filed: Sep. 19, 1984

Related U.S. Application Data

[63] Continuation-in-part of Ser. No. 500,215, Jun. 2, 1983, abandoned.

[51] Int. Cl.$^4$ .............................................. E21B 43/22
[52] U.S. Cl. .................... 166/275; 252/8.551; 252/8.554; 526/304
[58] Field of Search .................... 166/275; 252/8.55 D

[56] References Cited

U.S. PATENT DOCUMENTS

| | | | |
|---|---|---|---|
| 2,520,381 | 8/1950 | Carnes | 260/404 |
| 4,326,969 | 4/1982 | Hunter | 166/275 |
| 4,358,355 | 11/1982 | Kalu | 526/304 |
| 4,452,916 | 6/1984 | Boschetti | 526/285 |

OTHER PUBLICATIONS

Lee, et al., *Handbook of Epoxy Resins*, McGraw-Hill, NY, 1968, pp. 5-33 and 5-39.

*Primary Examiner*—C. Warren Ivy

[57] ABSTRACT

A monomer, polymers containing the monomer, and the use of the polymer in oilfield flooding is disclosed. The subject monomer is represented by the general formula:

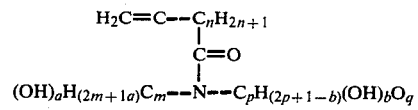

wherein: n is an integer from 0 to about 4; m is an integer from 0 to about 6; a is an integer equal to at least 1 except where m is equal to 0, a must equal 0 and where m is equal to 1, a must equal 0 or 1; p is an integer from 2 to about 10; b is an integer equal to at least 1 and is of sufficient magnitude that the ratio b/p is at least 0.2; and q is an integer from 0 to 2. The number of hydroxy groups in the monomer is believed to be critical, and therefore the sum of (a+b) divided by the sum (m+p) should be at least 0.2. The moieties linked to the acrylic nitrogen can be joined to provide a ringed structure.

9 Claims, No Drawings

OILFIELD FLOODING POLYMER

This application is a continuation-in-part of applicants' application Ser. No. 500,215 filed on June 2, 1983, now abandoned.

BACKGROUND OF THE INVENTION

The use of polymers in oilfield flooding for the enhanced recovery of hydrocarbons from underground formations is well known. Primarily two types of polymers are currently being employed commercially: synthetic polymers, principally partially hydrolyzed polyacrylamides, and biologically produced polysaccharides. Although both types of materials have been successfully employed in field applications, both suffer from limitations and deficiencies. In particular, with respect to the synthetic polymers, these problems include shear degradation, viscosity loss in brines, reaction with divalent ions, metal ion degradation, hydrolysis reactions, microbial degradation, filtration requirements, and excessive polymer loss by retention or adsorption in rock formations. Of these, viscosity retention in brine and stability to shear are considered to be of primary importance for a successful oilfield flooding polymer and are considered to be the major weaknesses of currently available partially hydrolyzed polyacrylamides.

OBJECTS OF THE INVENTION

In view of the recognized weaknesses of the current commercially available synthetic polymers, it is an object of this invention to provide a monomer which, when incorporated into a polymer, will provide a polymer with improved viscosity retention in brine and stability to shear. It is a further object of the instant invention to provide a monomer which, when incorporated within the structure of conventional partially hydrolyzed polyacrylamides, will provide for polymers with improved viscosity retention in brine and stability to shear. It is a further object of this invention to provide polymers having improved viscosity retention in brine and stability to shear. It is still a further object of this invention to provide a polymer useful for the polymer flooding of oil fields for the enhanced recovery of hydrocarbons contained therein.

These and other objects of the instant invention have been satisfied by the discovery that a class of monomers provides to polymers into which they are incorporated an improved viscosity retention in brine and stability to shear. The improvements provided by the monomer are particularly suitable when the monomer is incorporated into a polymer in combination with acrylamide monomer and sodium acrylate to form a terpolymer similar to conventional partially hydrolyzed acrylamides. The inclusion of this class of monomer into the conventional structure, however, provides that structure with improved viscosity retention in brine and shear stability.

DESCRIPTION OF THE INVENTION

There has been discovered a class of monomers which, when incorporated into polymers, provides said polymers with improved viscosity retention in brine and shear stability. As viscosity retention in brine and shear stability are primary attributes required of polymers for use in oilfield flooding, the resulting polymers are particularly useful in enhanced oil recovery.

In particular, the instant monomer can be represented by the general formula:

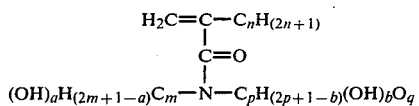

wherein:
n is an integer from 0 to about 4;
m is an integer from 0 to about 6;
p is an integer from 2 to about 10;
a is an integer equal to at least 1 except where m is equal to 0, a must be equal to 0; and where m is equal to 1, a must equal 0 or 1;
b is an integer equal to at least 1 and is of sufficient magnitude that the ratio of b/p is at least 0.2;
q is an integer from 0 to 2; and the sum of (a+b) divided by the (m+p) is at least 0.2. Additionally, the moieties represented as

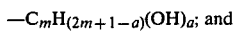

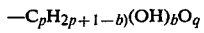

may be joined as represented by the general formula:

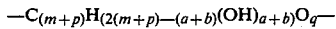

to form a ringed structure incorporating the acrylic nitrogen. While any polymer incorporating the above disclosed monomer is within the scope of the contemplated invention, the monomer is particularly useful with respect to enhanced oil recovery applications when incorporated into a polymer represented by the general structure:

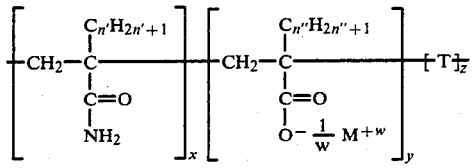

wherein:
n' and n" are integers individually selected from the set 0 to about 4;
T is the instant monomer described above;
M is a monovalent cation selected from the group consisting of hydrogen, sodium, potassium and ammonium or a divalent cation selected from calcium or magnesium as well as mixtures thereof.
w equals +1 or +2; and
x, y, and z represent the mole percent of the subtended monomer present in said polymer.

Generally the acrylamide monomer will be present at a level of about 1 to about 99 percent. The acrylate monomer can be totally absent or can be present in levels up to about 80 percent. The monomer of the instant invention can be present in levels of about 1 to about 50 percent.

With respect to the use of this material in enhanced oil recovery, the use of synthetic polymers is well known to those versed in that art, and the benefits of the polymers of the instant invention may be realized merely by substituting the instant polymers for the prior art, partially hydrolyzed polyacrylamides. Such applications are particularly subject to variations specific to the site where the material will actually be employed; however, the selection of parameters for each such application are within the realm of simple experimentation expected with such applications.

DETAILED DESCRIPTION OF THE INVENTION

Applicants have discovered that a class of monomers, which, when incorporated into polymers, provide the polymers with improved viscosity retention in brine solutions and improved shear stability. Most generally, the instant monomer can be represented by the structure:

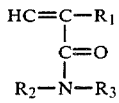

and contemplate the situation wherein $R_2$ and $R_3$ are joined to form a cyclic structure.

Generally, the most practically, $R_1$ is either hydrogen or alkyl and is more precisely represented as the moiety:

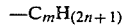

$R_1$ may be hydrogen, i.e., n may equal 0 or may be methyl, ethyl, propyl or longer so long as this ligand does not interfere with the polymerization of the molecule. Essentially, $R_1$ could be any ligand; however, as this group becomes larger and more functional, interference with the desired properties of the monomer could be expected, and therefore it is limited generally to situations where n is an integer from 0 to 4. The preferred situation is when $R_1$ is either hydrogen or methyl (n=0 or 1) and most preferred is $R_1$ being hydrogen (m=0).

Generally, $R_2$ is hydrogen, methyl or hydroxyalkyl and is represented as the moiety:

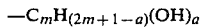

where m is 0 to about 6, a is an integer equal to at least 1 except where $R_2$ is hydrogen (i.e., m=0, a=0) or methyl (m=1, a=0). As the alkyl aspect of the moiety increases, it is believed that additional hydroxy groups may prove more efficacious, although more than about 3 may be unnecessary, i.e., a>1. Generally, the alkyl aspect of the moiety will be straight chain; however, branching is believed to be tolerable provided that the branching is nearer the terminal end of the alkyl chain. Additionally, contemplated within the scope of this moiety is any other ligand which does not adversely affect the overall efficacy of the monomer and could include such chemical entities as phenyl, ether-linked oxygen, or generally any non-reactive, or more precisely non-interactive, functional groups. Again, it is believed that there is some size limitation as to $R_2$, and it should not be made inordinately large without some expectation of some overall loss of function of the monomer.

Preferably, $R_2$ will be hydrogen, hydroxy methyl or hydroxy ethyl with hydrogen being the most preferred form.

While not wishing to be bound by and theory, it is the applicants' belief that the primary contribution to the efficacy of this monomer comes from the $R_3$ moiety. Generally, this moiety can be characterized by the presence of hydroxy alkyl species, either straight chain, branched, or cyclic.

Generally, the structure can be represented by the formula:

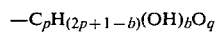

wherein p is an integer from 2 to about 10 and b is an integer equal to at least 1 and is of sufficient magnitude such that the ratio of b/p is at least 0.2, more preferably at least 0.5 and most preferably at least 0.75. q is an integer from 0 to 2 and is generally preferred to be 0. The oxygen is incorporated into the moiety in a neutral form, for example as an ether linkage. Additionally, the moiety $R_3$ may be cyclic in which case the hydrogen count as given by the general formula above is understood to be reduced by 1. An example of such a cyclic material includes the situation where p=6, q=1 and b=4.

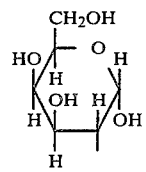

Preferred $R_3$ moieties include hydroxyethyl, hydroxypropyl, hydroxybutyl and hydroxyhexyl with the most preferred moiety being tris(hydroxymethyl)methyl).

Additionally contemplated within the scope of the present invention is the situation wherein $R_2$ and $R_3$ join to form a cyclic moiety incorporating the acrylamide nitrogen. In such cases the combined moiety may be represented using the nomenclature used above as

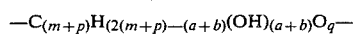

Examples of such moieties (showing the included acrylamide nitrogen include but are not limited to

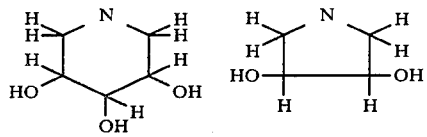

Monomers within the scope of the invention demonstrate various levels of acceptable improvement in brine tolerance and shear stability; however, no clear-cut predictability relating structure to performance has been determined. Examples of monomers arranged in descending order of performance include:

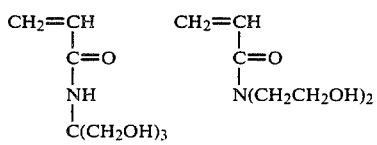

-continued

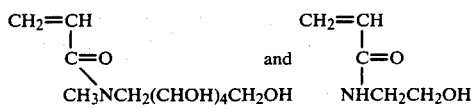

The monomer may be prepared by any conventional chemical technique. A technique for the preparation of the monomer is suggested by Jedlinski and Paprotny, Roczniki Chemii, 40, 1487–93 (1966). The preparation of N-(2-hydroxy-1,1-bis(hydroxymethyl)ethyl)acrylamide demonstrates the general preparative scheme, and the various monomers within the scope of the invention can be prepared by simple variation thereof by one skilled in the art.

Tris(hydroxymethyl)aminomethane and acrylol chloride in a 2:1 molar ratio are slurried in dry acetonitrile. For each gram of tris(hydroxymethyl)aminomethane in the reaction mixture, about 2 to 3 ml of acetonitrile is used. The reaction is run for either 120 hours at room temperature or 24 hours at about 60° C. The reaction is believed to proceed as follows:

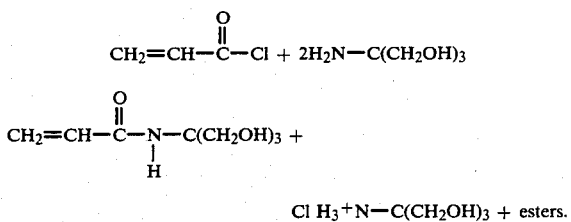

The product is then isolated by stirring the solid phase mixture of product and byproducts is warm (50° to 60° C.) acetone, filtering and then recrystallizing the product from the filtrate.

An alternative procedure using the same monomer as a model utilizing a reaction in bulk between methylacrylate and tris(hydroxymethyl)aminomethane has been suggested by Kulagina et al, Sin. Modif. Sin. Polium, 20–34 (1971); Ubeksk. Khim. Zh., 10(2), 35–9′ (1966) and Askarov et al., Vysokonoil. Soedin. Ser. B, 15(5), 326-9, (1973).

It is believed the reaction proceeds as follows:

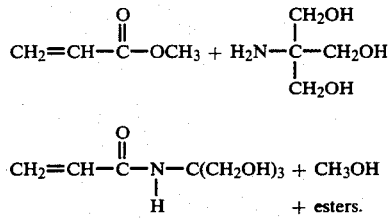

The polymers of the instant invention may be prepared by any conventional form of polymerization, and generally aqueous solution polymerization proves satisfactory. Copolymerization with acrylamide has been carried out in deaerated, distilled water under a nitrogen blanket. Polymerizations with total solids ranging from 4 to 10 percent have been run. Higher or lower concentrations of the monomer can also be polymerized effectively. Generally, the higher the solids concentration used, the higher the viscosity obtained. This may be a factor of molecular weight, or the higher solids content may lead to extensive crosslinking. Generally, optimization of molecular weight is achieved by using 0.2 weight percent (based on monomer) of ammonium persulfate as the initiator without the presence of an activator. There appears to be no reason why other initiator systems cannot be successfully employed.

Terpolymerization may be achieved either by direct polymerization of the instant monomer, acrylamide and acrylate or by post-hydroylsis of the copolymer with acrylamide. Surprisingly, and for reasons yet unknown to the applicants, this latter technique for forming the terpolymer produces a polymer with surprisingly improved brine tolerance and shear insensitivity over compounds made by direct terpolymerization. This observation is disclosed in the applicants' copending application Ser. No. 500,216 filed in June 2, 1983.

Polymers containing the instant monomer as described above will provide improved brine tolerance and demonstrate less sensitivity to shear. Particularly good results are obtained in polymers represented by the general formula:

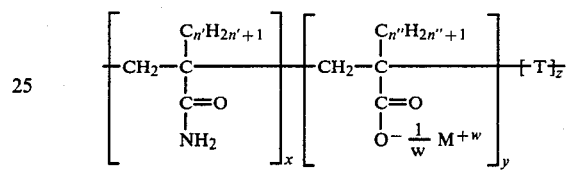

In this formula n′ and n″ are integers individually selected from the set 0 to 4, although any other moiety so attached to the backbone of the polymer is contemplated within the scope of the invention so long as it does not adversely affect the performance of the polymer. Preferably, n′ and n″ are individually selected from the group consisting of 0 and 1 with n′ and n″ equaling 0 being the most preferred form.

The letter T represents the instant monomer as described above.

The letter M is a monovalent cation selected from the group consisting of hydrogen, sodium, potassium and ammonium or a divalent cation selected from calcium or magnesium as well as mixtures thereof.

The letters x, y and z represent the relative mole percent of the respective monomers which they subtend. In general, x is about 1 to 99 percent; y is 0 to about 80 percent; and z is about 1 to about 50 percent. While the anionic monomer is disclosed as ranging from 0 percent, it is acknowledged that most polymerizations will yield some amount of anionic species through side hydrolysis.

Preferably, the amount of acrylic monomer (x) is about 5 to 85 percent; the amount of acrylate monomer (y) is about 10 to 65 percent and the amount of the instant monomer (2) is about 2 to 40 percent. Most preferably, x is about 30 to about 70 percent; y is about 20 to about 50 percent; and z is about 3 to about 30 percent.

The acrylate monomer may be in the acid or salt form with the salts of sodium being generally preferred. The more preferred form of polymer is where the monomer is of the form where n is 0 to 1, m is 0 to 2 and p is 2 to 6 with the most preferred form being where n and m are 0 and p is 4. In particular, the most preferred form a polymer especially for use in enhanced oil recovery is the form where the monomer T has the general formula:

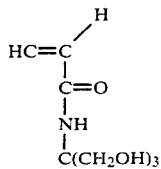

As stated above, the use of synthetic polymers in oilfield flooding is well known in the art. It is equally well known and understood that individual applications require a moderate amount of experimentation expected in the art. Accordingly, the instant polymers may be substituted for existing polymers in conventional oilfield polymer flooding techniques with expected experimentation recognized in the art.

The following examples are for illustrative purposes only and are in no way meant to limit the scope of the applicants' claimed invention which will be defined in the claims to follow. All proportions are given by weight unless otherwise indicated.

EXAMPLE 1

Poly(acrylamide-co-N-(2-hydroxy-1,1-(hydroxy)methylethyl)acrylamide was synthesized according to the procedures set forth in the detailed disclosure. Samples of this material were then partially hydrolyzed to various levels of anionicity. The viscosities retained on shear, viscosities retained in brine, and combined retained viscosities were then measured and compared with those of a number of commercial, partially hydrolyzed poly(acrylamides) of similar reduced viscosities in 0.01% NaCl. The results are contained in Table I.

As can be seen from the examples, the polymers of the instant invention demonstrated superior shear stability and reduction of viscosity loss in brine compared with the commercial, partially hydrolyzed poly(acrylamides).

EXAMPLE 2

A series of copolymers of acrylamide and N-trisacrylamide were prepared as described in the detailed description. These materials were tested for shear stability and the results compared with those of a number of acrylamide homopolymer. The data are contained in Table 2.

TABLE I

| EXAMPLE | CARBOXYL* CONTENT (±2%) | N—HYDROXYALKYL ACRYLAMIDE** (±5%) | ACRYLAMIDE CONTENT (±4%) | PERCENT VISCOSITY RETAINED ON SHEAR | PERCENT VISCOSITY RETAINED IN BRINE | PERCENT VISCOSITY RETAINED ON SHEAR IN BRINE |
|---|---|---|---|---|---|---|
| 1 | 20 | 26 | 55 | 80.9 | 21.1 | 12.6 |
| 2 | 23 | 27 | 50 | 86.2 | 17.6 | 10.7 |
| 3 | 27 | 22 | 51 | 85.6 | 15.2 | 8.3 |
| 4 | 27 | 23 | 50 | 89.7 | 17.8 | 12.8 |
| 5 | 31 | 30 | 40 | 83.3 | 18.8 | 10.8 |
| 6 | 31 | 25 | 44 | 90.9 | 20.7 | 13.4 |
| 7 | 33 | 29 | 38 | 89.4 | 20.0 | 24.7 |
| 8 | 35 | 22 | 43 | 90.2 | 17.4 | 11.8 |
| 9 | 41 | 25 | 34 | 88.3 | 14.8 | 8.7 |

| EXAMPLE | CARBOXYL* CONTENT (±2%) | N—ALKYL ACRYLAMIDE | ACRYLAMIDE CONTENT (±4%) | PERCENT VISCOSITY RETAINED ON SHEAR | PERCENT VISCOSITY RETAINED IN BRINE | PERCENT VISCOSITY RETAINED ON SHEAR IN BRINE |
|---|---|---|---|---|---|---|
| 1 | 18 | 0 | 82 | 87.2 | 13.8 | 12.1 |
| 2 | 28 | 0 | 72 | 77.6 | 17.0 | 13.3 |
| 3 | 29 | 0 | 71 | 84.4 | 10.9 | 8.5 |
| 4 | 33 | 0 | 67 | 97.3 | 9.7 | 8.1 |
| 5 | 35 | 0 | 65 | 95.9 | 10.2 | 8.5 |
| 6 | 38 | 0 | 62 | 90.5 | 10.2 | 8.1 |
| 7 | 39 | 0 | 61 | 79.3 | 18.1 | 10.4 |
| 8 | 41 | 0 | 59 | 88.5 | 10.3 | 8.4 |
| 9 | 42 | 0 | 58 | 99.3 | 15.9 | 13.0 |
| 10 | 44 | 0 | 56 | 75.0 | 13.5 | 9.7 |
| 11 | 44 | 0 | 56 | 75.2 | 15.0 | 9.5 |

*wt. % sodium acrylate
**wt. % N—(2-hydroxy-1,1-(hydroxymethyl)ethyl)acrylamide

TABLE 2

| Sample | Conc (g/dl) | Tris Content (wt %) | % Viscosity Retained on Shear | Reduced Viscosity in 0.019 NaCl (dl/g) |
|---|---|---|---|---|
| 1 | .0874 | 0 | 45.0 | 32.50 |
| 2 | .0801 | 0 | 59.7 | 18.78 |
| 3 | .0809 | 0 | 43.4 | 27.27 |
| 4 | .0832 | 0 | 58.7 | 18.18 |
| 1 | .0799 | 30.1 | 83.1 | 10.51 |
| 2 | .0762 | 21.5 | 85.4 | 16.35 |
| 3 | .0883 | 19.1 | 62.2 | 15.77 |
| 4 | .0746 | 18.5 | 86.1 | 17.72 |
| 5 | .0631 | 11.7 | 78.7 | 11.04 |

What is claimed is:

1. In the process of recovering hydrocarbons from a subterranean formation by polymer flooding comprising injecting into said formation a viscous aqueous solution of polymer, the improvement comprising including in said solution an amount of water-soluble polymer effective to increase the viscosity thereof, said water-soluble polymer represented by the general structure:

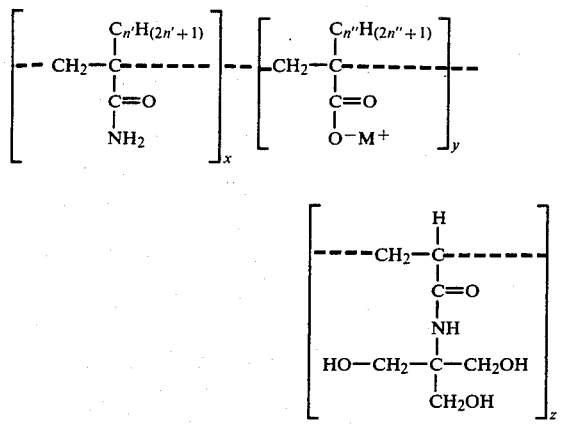

wherein:
- n' and n" are integers individually selected from the set of 0 to about 4;
- M+ is a cation selected from the group consisting of hydrogen, sodium, ammonium, potassium, and mixtures thereof; and x, y, and z represent the mole percent of the subtended monomer present in said polymer and wherein:
- x is about 1 to about 99 percent;
- y is 0 to about 80 percent; and
- z is about 1 to about 50 percent.

2. The process of claim 1 wherein x is about 5 to 85 percent; y is about 10 to about 65 percent; and z is about 35 percent.

3. The process of claim 2 wherein x is about 30 to about 70 percent; y is about 50 percent; and z is about 10 to 20 percent.

4. The process of claim 1 wherein n is 0 to 1.

5. The process of claim 4 wherein n' and n" are individually selected from the group 0 and 1.

6. The process of claim 5 wherein n is 0.

7. The process of claim 1 wherein:
- x is about 30 to 70 percent;
- y is about 20 to about 30 percent and
- z is about 3 to about 30 percent.

8. The process of claim 7 wherein n' and n" are 0 and M+ is a sodium cation.

9. In the process of recovering hydrocarbons from a subterranean formation by polymer flooding comprising injecting into said formation a viscous aqueous solution of polymer, the improvement comprising including in said solution an amount of water-soluble polymer effective to increase the viscosity thereof, said water-soluble polymer containing at least about one percent groups derived from monomers represented by the general structure:

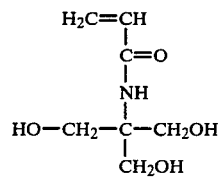

* * * * *